(12) United States Patent
Simpson et al.

(10) Patent No.: US 7,323,262 B2
(45) Date of Patent: Jan. 29, 2008

(54) METHOD OF OPERATING A FUEL CELL POWER SYSTEM TO DELIVER CONSTANT POWER

(75) Inventors: Todd A. Simpson, Brampton (CA); Stephen Burany, Thornhill (CA); Joseph Cargnelli, Toronto (CA)

(73) Assignee: Hydrogenics Corporation, Mississauga (CA)

( * ) Notice: Subject to any disclaimer, the term of this patent is extended or adjusted under 35 U.S.C. 154(b) by 290 days.

(21) Appl. No.: 10/722,570

(22) Filed: Nov. 28, 2003

(65) Prior Publication Data
US 2004/0161657 A1   Aug. 19, 2004

Related U.S. Application Data

(60) Provisional application No. 60/429,317, filed on Nov. 27, 2002.

(51) Int. Cl.
*H01M 8/00* (2006.01)
*H01M 8/04* (2006.01)
*H01M 8/12* (2006.01)
*H01M 8/18* (2006.01)

(52) U.S. Cl. .............................. 429/12; 429/13; 429/22

(58) Field of Classification Search .................. 429/12, 429/13, 21, 23, 14, 17
See application file for complete search history.

(56) References Cited

U.S. PATENT DOCUMENTS

| | | | |
|---|---|---|---|
| 5,047,298 A * | 9/1991 | Perry et al. ..................... | 429/17 |
| 5,192,627 A * | 3/1993 | Perry et al. ..................... | 429/17 |
| 5,344,721 A | 9/1994 | Sonai et al. | |
| 5,763,113 A * | 6/1998 | Meltser et al. ................. | 429/13 |
| 5,786,104 A | 7/1998 | Black et al. | |
| 5,996,976 A | 12/1999 | Murphy et al. | |
| 6,013,385 A | 1/2000 | DuBose | |
| 6,103,409 A * | 8/2000 | DiPierno Bosco et al. ... | 429/13 |
| 6,117,577 A | 9/2000 | Wilson | |
| 6,242,120 B1 * | 6/2001 | Herron ......................... | 429/22 |
| 6,329,090 B1 | 12/2001 | McElroy et al. | |
| 6,376,111 B1 * | 4/2002 | Mathias et al. ................ | 429/13 |
| 6,861,167 B2 * | 3/2005 | Wells et al. ................... | 429/13 |
| 2001/0004500 A1 | 6/2001 | Grasso et al. | |

(Continued)

FOREIGN PATENT DOCUMENTS

EP   0 716 463   6/1996

(Continued)

OTHER PUBLICATIONS

Stephen Gurski and Douglas J. Nelson, Design and Integration Challenges For a Fuel Cell Hybrid Electric Sport Utility Vehicle, SAE 2002 World Congress, Detroit, Michigan, Mar. 4-7, 2002.

*Primary Examiner*—M. Alexandra Elve
(74) *Attorney, Agent, or Firm*—Bereskin & Parr

(57) ABSTRACT

The present invention relates to a fuel cell system and a method of operating same, The fuel cell has a first reactant inlet, a first reactant outlet, a second reactant inlet, a second reactant outlet. The invention involves (a) providing a first reactant incoming stream to the first reactant inlet; (b) providing a second reactant incoming stream to the second reactant inlet; (c) monitoring a fuel cell state variable indicative of flooding; (d) based on the fuel cell state variable, determining whether the fuel cell is flooded; and, (e) providing an additional amount of the first reactant to the fuel cell when the fuel cell is flooded.

27 Claims, 8 Drawing Sheets

U.S. PATENT DOCUMENTS

| | | |
|---|---|---|
| 2001/0012575 A1 | 8/2001 | Kataglri et al. |
| 2002/0006537 A1 | 1/2002 | Kobayashi et al. |
| 2002/0015867 A1 | 2/2002 | Cargnelli et al. |
| 2002/0022167 A1 | 2/2002 | Herron |
| 2002/0098397 A1 | 7/2002 | Chen et al. |
| 2003/0003330 A1* | 1/2003 | Ballantine et al. ............ 429/13 |
| 2003/0031906 A1 | 2/2003 | Cargnelli et al. |
| 2005/0244687 A1* | 11/2005 | Herron ........................ 429/22 |

FOREIGN PATENT DOCUMENTS

| | | |
|---|---|---|
| EP | 0 827 226 | 3/1998 |
| EP | 0 948 069 | 10/1999 |
| WO | WO 01/97311 | 12/2001 |
| WO | WO 02/11224 | 2/2002 |

* cited by examiner

METHOD OF OPERATING A FUEL CELL POWER SYSTEM TO DELIVER CONSTANT POWER

FIELD OF THE INVENTION

The present invention relates generally to fuel cell power system and a method of operating a fuel cell power system. More particularly, the present invention relates to a method of operating a fuel cell system to deliver constant power output.

BACKGROUND OF THE INVENTION

Fuel cell systems are seen as a promising alternative to traditional power generation technologies due to their low emissions, high efficiency and ease of operation. Fuel cells operate to convert chemical energy into electrical energy. Proton exchange membrane fuel cells comprise an anode, a cathode, and a selective electrolytic membrane disposed between the two electrodes. In a catalyzed reaction, a fuel such as hydrogen, is oxidized at the anode to form cations (protons) and electrons. The ion exchange membrane facilitates the migration of protons from the anode to the cathode. The electrons cannot pass through the membrane and are forced to flow through an external circuit thus providing an electrical current. At the cathode, oxygen reacts at the catalyst layer, with electrons returned from the electrical circuit, to form anions. The anions formed at the cathode react with the protons that have crossed the membrane to form liquid water as the reaction product.

Proton exchange membranes require a wet surface to facilitate the conduction of protons from the anode to the cathode, and otherwise to maintain the membranes electrically conductive. It has been suggested that each proton that moves through the membrane drags at least two or three water molecules with it (U.S. Pat. No. 5,996,976). U.S. Pat. No. 5,786,104 describes in qualitative terms a mechanism termed "water pumping", involving the transport of cations (protons) with water molecules through the membrane. As the current density increases, the number of water molecules moved through the membrane also increases. Eventually the flux of water being pulled through the membrane by the proton flux exceeds the rate at which water is replenished by diffusion. At this point the membrane begins to dry out, at least on the anode side, and its internal resistance increases. It will be appreciated that this mechanism drives water to the cathode side, and additionally the water created by reaction is formed at the cathode side. Nonetheless, it is possible for the flow of gas across the cathode side to be sufficient to remove this water, resulting in drying out on the cathode side as well. To maintain membrane conductivity, the surface of the membrane must remain moist at all times. Therefore, to ensure adequate efficiency, the process gases must be, on entering the fuel cell, at an appropriate humidity and at a suitable temperature for keeping the membrane moist. The range for suitable humidities and temperatures will depend on system requirements.

A further consideration is that there is an increasing interest in using fuel cells in transport and like applications, e.g. as the basic power source for cars, buses and even larger vehicles. Automotive applications are quite different from many stationary applications. For example in stationary applications, fuel cell stacks are commonly used as an electrical power source and are simply expected to run at a relatively constant power level for an extended period of time. In contrast, in an automotive environment, the actual power required from the fuel cell stack can vary widely. Additionally, the fuel cell stack supply unit is expected to respond rapidly to changes in power demand, whether these be demands for increased or reduced power, while maintaining high efficiencies. Further, for automotive applications, a fuel cell power unit is expected to operate under an extreme range of ambient temperature and humidity conditions.

All of these requirement are exceedingly demanding and make it difficult to ensure a fuel cell stack will operate efficiently under all the possible range of operating conditions. While the key issues are ensuring that a fuel cell power unit can always supply a high power level and at a high efficiency and simultaneously ensuring that it has a long life, accurately controlling humidity levels within the fuel cell power unit is necessary to meet these requirements. More particularly, it is necessary to control humidity levels in both the oxidant and fuel gas streams. Most known techniques of humidification are ill designed to respond to rapidly changing conditions, temperatures and the like. Many known systems can provide inadequate humidification levels, and may have high thermal inertia and/or large dead volumes, so as to render them incapable of rapid response to changing conditions.

An apparatus and method of controlling temperature and humidity in fuel cell systems is disclosed in the applicant's co-pending U.S. patent application Ser. No. 09/801,916. The method comprises: humidifying a fuel cell process gas stream at a first temperature so as to provide the process gas stream with excess humidity, cooling the process gas stream at a second temperature, lower than the first temperature, to cause condensation of excess moisture, removing excess condensed moisture from the process gas stream and delivering the process gas stream at a known temperature, whereby the relative humidity level in the process gas stream is determined from the ratio of the saturation pressures of the second and the said known temperatures. Particularly, the method includes recovering humidity from the exhausted process gas generated by the fuel cell and using the recovered moisture to humidify at least one of the incoming fuel and oxidant streams. However, this method requires a large number of components and hence reduces the overall efficiency of the fuel cell system.

Another method is disclosed in U.S. Pat. No. 6,013,385. In this patent, a fuel cell gas management system is disclosed. The system comprises: a first reactant humidification subsystem for supplying a first reactant inlet stream to the first reactant inlet of the fuel cell and receiving a first reactant exhaust stream from the first reactant outlet of the fuel cell, said first reactant humidification subsystem comprising an enthalpy wheel for collecting moisture from the first reactant (oxidant) exhaust stream and transferring a portion of the collected moisture to the first reactant inlet stream; a second reactant (fuel) humidity retention subsystem comprising a recirculation loop for collecting excess second reactant from the second reactant outlet of the fuel cell, a source of second reactant mixing means for mixing second reactant from a reactant source with second reactant collected from the second reactant outlet of the fuel cell and motive means for circulating second reactant in said recirculation loop and for introducing second reactant into the second reactant inlet of the fuel cell. However, this patent still fails to fully utilize the waste heat and humidity from fuel cell exhaust. There remains a need for a fuel cell gas management system that can offer rapid dynamic control of temperatures and relative humidities for incoming fuel cell process gases.

Although humidification of reactant streams is a major concern of fuel cell system designers, flooding is also a problem that frequently occurs in fuel cells since reactant streams are usually humidified and water is a product of fuel cell reaction. When one or more cell is flooded in a fuel cell stack, cell voltage of the flooded cell drops and hence the power output of the fuel cell stack decreases. Flooding significantly affects the performance of a fuel cell power system and may lead to permanent damage to the fuel cell stack. Therefore, it is desirable to provide a method of alleviating the flooding problem of fuel cell systems.

SUMMARY OF THE INVENTION

In accordance with a first aspect of the present invention, there is provided a fuel cell system, comprising: (a) a fuel cell having a first reactant inlet, a first reactant outlet, a second reactant inlet, and a second reactant outlet; (b) a first reactant supply subsystem including a first reactant supply means for supplying a first reactant incoming stream to the first reactant inlet of the fuel cell; (c) a second reactant supply subsystem for supplying a second reactant incoming stream to the second reactant inlet of the fuel cell; (d) a monitoring device for monitoring a fuel cell state variable indicative of flooding of the fuel cell; and, (e) a controller for controlling the first reactant supply means to provide an additional amount of the first reactant to the fuel cell based on the fuel cell state variable.

In accordance with a second aspect of the present invention, there is provided a method of operating a fuel cell system. The fuel cell has a first reactant inlet, a first reactant outlet, a second reactant inlet, a second reactant outlet. The method comprises (a) providing a first reactant incoming stream to the first reactant inlet; (b) providing a second reactant incoming stream to the second reactant inlet; (c) monitoring a fuel cell state variable indicative of flooding; (d) based on the fuel cell state variable, determining whether the fuel cell is flooded; and, (e) providing an additional amount of the first reactant to the fuel cell when the fuel cell is flooded.

BRIEF DESCRIPTION OF THE DRAWINGS

For a better understanding of the present invention, and to show more clearly how it may be carried into effect, reference will now be made, by way of example, to the accompanying drawings, which show a preferred embodiment of the present invention and in which.

DETAILED DESCRIPTION OF PREFERRED ASPECTS OF THE INVENTION

Figure 1:
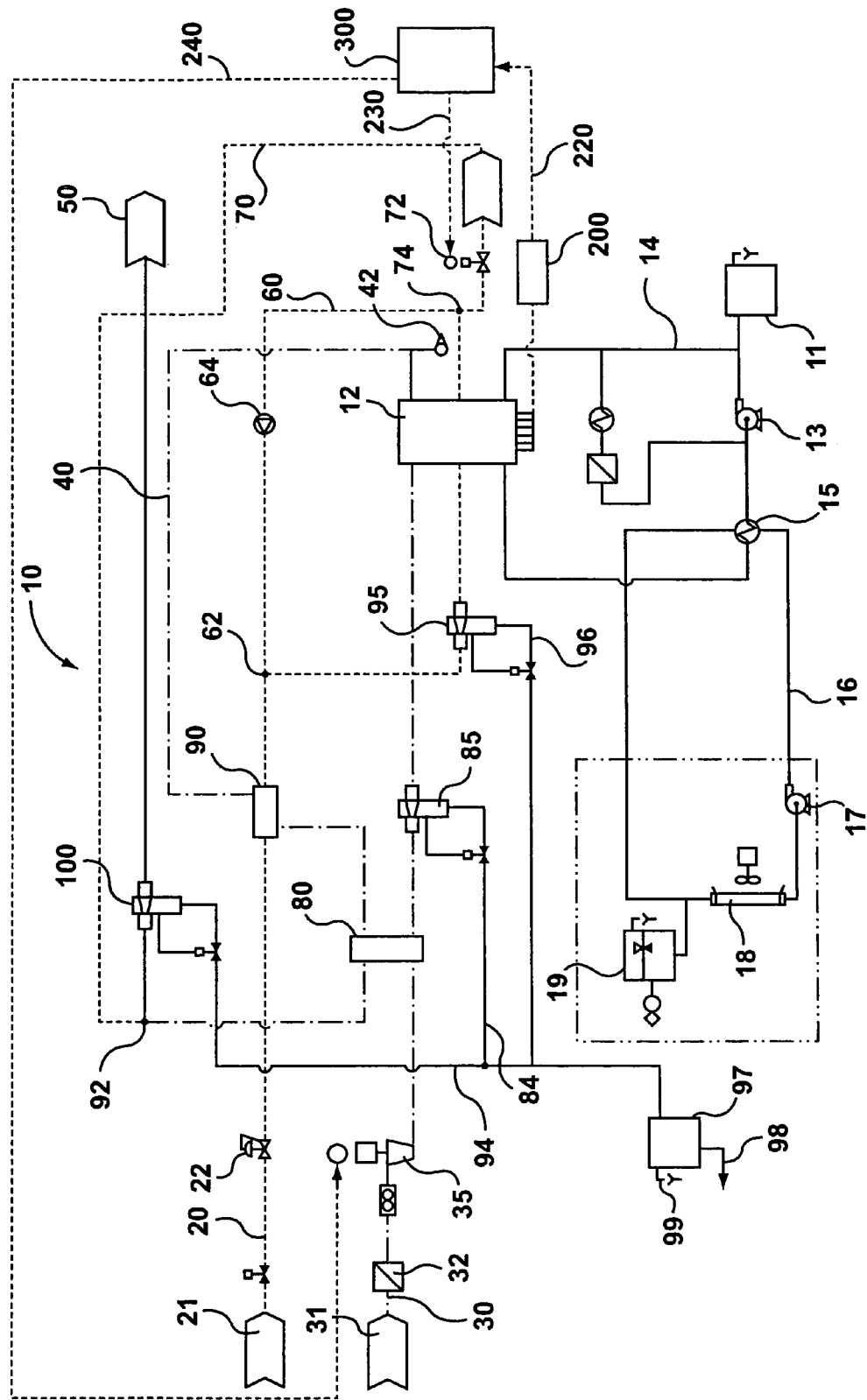
FIG. 1 illustrates a schematic flow diagram of a first embodiment of a fuel cell gas and water management system according to the present invention.

Referring first to FIG. 1, there is illustrated a schematic flow diagram of a first embodiment of a fuel cell gas management system 10 according to the present invention. The fuel cell gas management system 10 comprises a fuel supply line 20, an oxidant supply line 30, a cathode exhaust recirculation line 40 and an anode exhaust recirculation line 60, all connected to a fuel cell 12. It is to be understood that the fuel cell 12 may comprise a plurality of fuel cells or just a single fuel cell. For simplicity, the fuel cell 12 described herein operates on hydrogen as fuel and air as oxidant and can be a Proton Exchange Membrane (PEM) fuel cell. However, the present invention is not limited to this type of fuel cells and is applicable to other types of fuel cells that rely on other fuels and oxidants.

The fuel supply line 20 is connected to a fuel source 21 for supplying hydrogen to the anode of the fuel cell 12. A hydrogen humidifier 90 is disposed in the fuel supply line 20 upstream from the fuel cell 12 and an anode water separator 95 is disposed between the hydrogen humidifier 90 and the fuel cell 12. The oxidant supply line 30 is connected to an oxidant source 31, e.g. ambient air, for supplying air to the cathode of the fuel cell 12. A regenerative dryer 80 is disposed in the oxidant supply line 30 upstream of the fuel cell 12 and also in the cathode recirculation line 40. A cathode water separator 85 is disposed between the regenerative dryer 80 and the fuel cell 12. The regenerative dryer 80 can comprise porous materials with a desiccant and may be any commercially available dryer suitable for fuel cell system. The regenerative dryer 80 has a switch means to allow gases from the oxidant supply line 30 and the oxidant recirculation line 40 to alternately pass through the regenerative dryer 80 to exchange heat and humidity. Dry ambient air enters the oxidant supply line 30 and first passes through an air filter 32 that filters out the impurity particles. A blower 35 is disposed upstream of the regenerative dryer 80, to draw air from the air filter 32 and to pass the air through the regenerative dryer 80.

A fuel cell cathode exhaust stream contains excess air, product water and water transported from the anode side, the air being nitrogen rich due to consumption of at least part of the oxygen in the fuel cell 12. The cathode exhaust stream is recirculated through the cathode exhaust recirculation line 40 connected to the cathode outlet of the fuel cell 12. The humid cathode exhaust stream first passes through a hydrogen humidifier 90 in which the heat and humidity is transferred to incoming dry hydrogen in the fuel supply line 20. The hydrogen humidifier 90 can be any suitable humidifier, such as that commercially available from Perma Pure Inc, Toms River, N.J. It may also be a membrane humidifier and other types of humidifier with either high or low saturation efficiency. In fact, the hydrogen humidifier 90 is also a regenerative dryer, however, in view of the different gases in the anode and cathode streams, regenerative dryers or other devices that permit significant heat mass interchange between the two streams cannot be used.

From the hydrogen humidifier 90, the fuel cell cathode exhaust stream continues to flow along the recirculation line 40 and passes through the regenerative dryer 80, as mentioned above. As the humid cathode exhaust passes through the regenerative dryer 80, the heat and moisture is retained in the porous paper or fiber material of the regenerative dryer 80. After the porous paper or fiber material of the regenerative dryer 80 has been humidified by the humid cathode exhaust passing therethrough, the switch means of the regenerative dryer 80 switches the connection of the regenerative dryer 80 from the cathode exhaust stream to the incoming air stream, and the humidity retained in the porous paper or fiber material of the regenerative dryer 80 is then transferred to the incoming dry air stream passing through the regenerative dryer 80 in the oxidant supply line 30. Concurrently the cathode exhaust stream continues to flow along the recirculation line 40 to an exhaust water separator 100 in which the excess water, again in liquid form, that has not been transferred to the incoming hydrogen and air streams is separated from the exhaust stream. Then the exhaust stream is discharged to the environment along a discharge line 50.

A cathode outlet drain line 42 may optionally be provided in the recirculation line 40 adjacent the cathode outlet of the fuel cell to drain out any liquid water remaining or condensed out. The cathode outlet drain line 42 may be suitably sized so that gas bubbles in the drain line actually retain the water in the cathode outlet drain line and automatically drain water on a substantially regular basis, thereby avoiding the need of a drain valve that is commonly used in the field to drain water out of gas stream. Such a drain line can be used anywhere in the system where liquid water needs to be drained out from gas streams.

The humidified hydrogen from the hydrogen humidifier 90 flows along the fuel supply line 20 to the anode water separator 95 in which excess water is separated before the hydrogen enters the fuel cell 12. Likewise, the humidified air from the regenerative dryer 80 flows along the oxidant supply line 30 to the cathode water separator 85 in which excess liquid water is separated before the air enters the fuel cell 12.

Fuel cell anode exhaust comprising excess hydrogen and water is recirculated by a recirculation pump 64 along the anode recirculation line 60 connected to the anode outlet of the fuel cell 12. The anode recirculation line 60 connects to the fuel supply line 20 at a first joint 62 upstream from the anode water separator 95. The recirculation of the excess hydrogen together with water vapor not only permits utilization of hydrogen to the greatest possible extent and prevents liquid water from blocking hydrogen reactant delivery to the reactant sites, but also achieves self-humidification of the fuel stream since the water vapor from the recirculated hydrogen humidifies the incoming hydrogen from the hydrogen humidifier 90. This is highly desirable since this arrangement offers more flexibility in the choice of hydrogen humidifier 90 as the humidifier 90 does not then need to be a highly efficient one in the present system. By appropriately selecting the hydrogen recirculation flow rate, the required efficiency of the hydrogen humidifier 90 can be minimized. For example, supposing the fuel cell 12 needs one unit of hydrogen, hydrogen in the amount of three units can be passed through the fuel cell 12 with one unit of hydrogen being consumed while the two units of excess hydrogen are recirculated together with water vapor. The speed of recirculation pump 64 may be varied to adjust the portion of recirculated hydrogen in the mixture of hydrogen downstream from the first joint 62. The selection of stoichiometry and recirculation pump 64 speed may eventually lead to the omission of the hydrogen humidifier 90.

In practice, since air is used as oxidant, it has been found that nitrogen crossover from the cathode side of the fuel cell to the anode side can occur, e.g. through the membrane of a PEM fuel cell. Therefore, the anode exhaust actually contains some nitrogen and possibly other impurities. Recirculation of anode exhaust may result in the build-up of nitrogen and poison the fuel cell. Preferably, a hydrogen purge line 70 branches out from the fuel recirculation line 60 from a branch point 74 adjacent the fuel cell cathode outlet. A purge control device 72 is disposed in the hydrogen purge line 70 to purge a portion of the anode exhaust out of the recirculation line 60. The frequency and flow rate of the purge operation is dependent on the power on which the fuel cell 12 is running. When the fuel cell 12 is running on high power, it is desirable to purge a higher portion of anode exhaust. The purge control device 72 may be a solenoid valve or other suitable device.

The hydrogen purge line 70 runs from the branch point 74 to a second joint 92 at which it joins the cathode exhaust recirculation line 40. Then the mixture of purged hydrogen and the cathode exhaust from the regenerative dryer 80 passes through the exhaust water separator 100. Water is condensed in the water separator 100 and the remaining gas mixture is discharged to the environment along the discharge line 50. Alternatively, either the cathode exhaust recirculation line 40 or the purge line 70 can be connected directly into the water separator 100. It is also known to those skilled in the art that the purged hydrogen or the cathode exhaust from the regenerative dryer 80 can be separately discharged without condensing water therefrom.

Preferably, water separated by the anode water separator 95, cathode water separator 85, and the exhaust water separator 100 are not discharged, but rather the water is recovered respectively along anode inlet drain line 96, cathode inlet drain line 84 and discharge drain line 94 to a product water tank 97, for use in various processes. For this purpose, the tank 97 includes a line 98 for connection to other processes and a drain 99.

As is known to those skilled in the art, a first cooling loop 14 runs through the fuel cell 12. A first coolant pump 13 is disposed in the first cooling loop 14 for circulating the coolant. The coolant may be any coolant commonly used in the field, such as any non-conductive water, glycol, etc. A first expansion tank 11 can be provided in known manner. A first heat exchanger 15 is provided in the first cooling loop 14 for cooling the coolant flowing through the fuel cell 12 to maintain the coolant in an appropriate temperature range.

FIG. 1 shows one variant, in which a second cooling loop 16 includes a second coolant pump 17, to circulate a second coolant. A second heat exchanger 18, e.g. a radiator, is provided to maintain the temperature of the coolant in the second cooling loop and again, where required, a second tank 19 (shown in FIG. 2) is provided. The coolant in the second cooling loop 16 may be any type of coolant as the first and second cooling loops 14 and 16 do not mix. However, it is to be understood that the separate second cooling loop is not essential.

Figure 2:
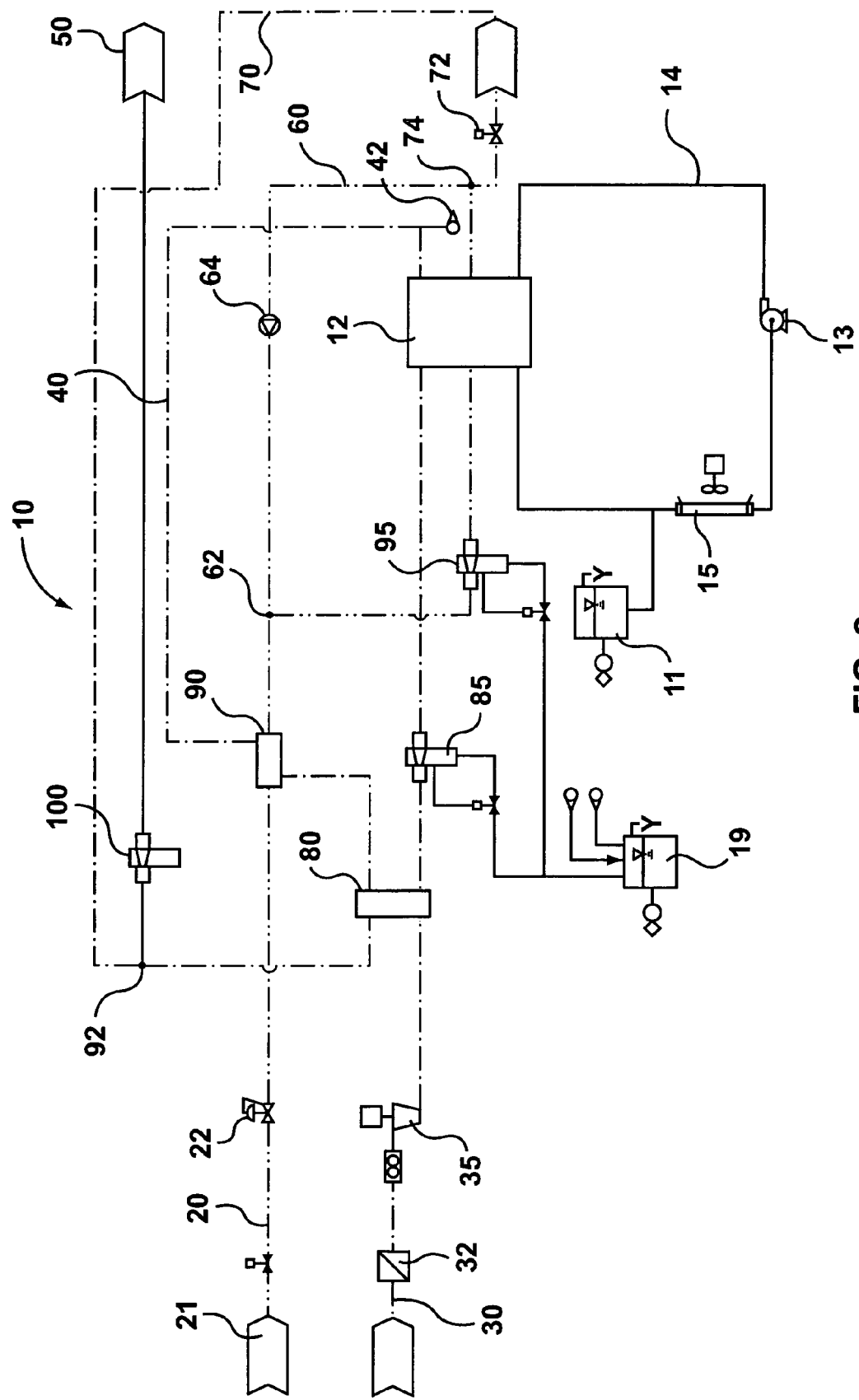
FIG. 2, in a schematic flow diagram, illustrates a second embodiment of a fuel cell gas and water management system to which aspects of the present invention may be applied.

Referring to FIG. 2, there is illustrated in a schematic flow diagram an alternative fuel cell gas and water management system. In FIG. 2, components similar to the components illustrated in FIG. 1 are indicated using the same reference numerals, and for simplicity and brevity, the description of these components is not repeated. As shown in FIG. 2, the heat exchanger 15 is again provided in the first cooling loop 14 to maintain the temperature of the coolant in the first cooling loop 14 at a desired level. In this case, the second cooling loop 16 is omitted. It is to be understood that the heat exchanger 15 in FIG. 1 could also be an isolation, brazed plate heat exchanger disposed in an "open" cooling loop, as may be desired in some applications. That is to say, the second cooling loop 16 can be an open cooling loop in which coolant is drawn from and returned to a coolant reservoir, such as atmosphere, sea, etc., and FIG. 2 indicates a cooling fan for blowing cooling air through the heat exchanger.

When water is used as coolant in either of the above variants, since the water from the separators 95, 85, 100 is product water from the fuel cell, and hence pure and non-conductive, it can be collected and directed to the expansion tank 11 or 19, or coolant reservoir as coolant during the fuel cell operation.

Figure 4:
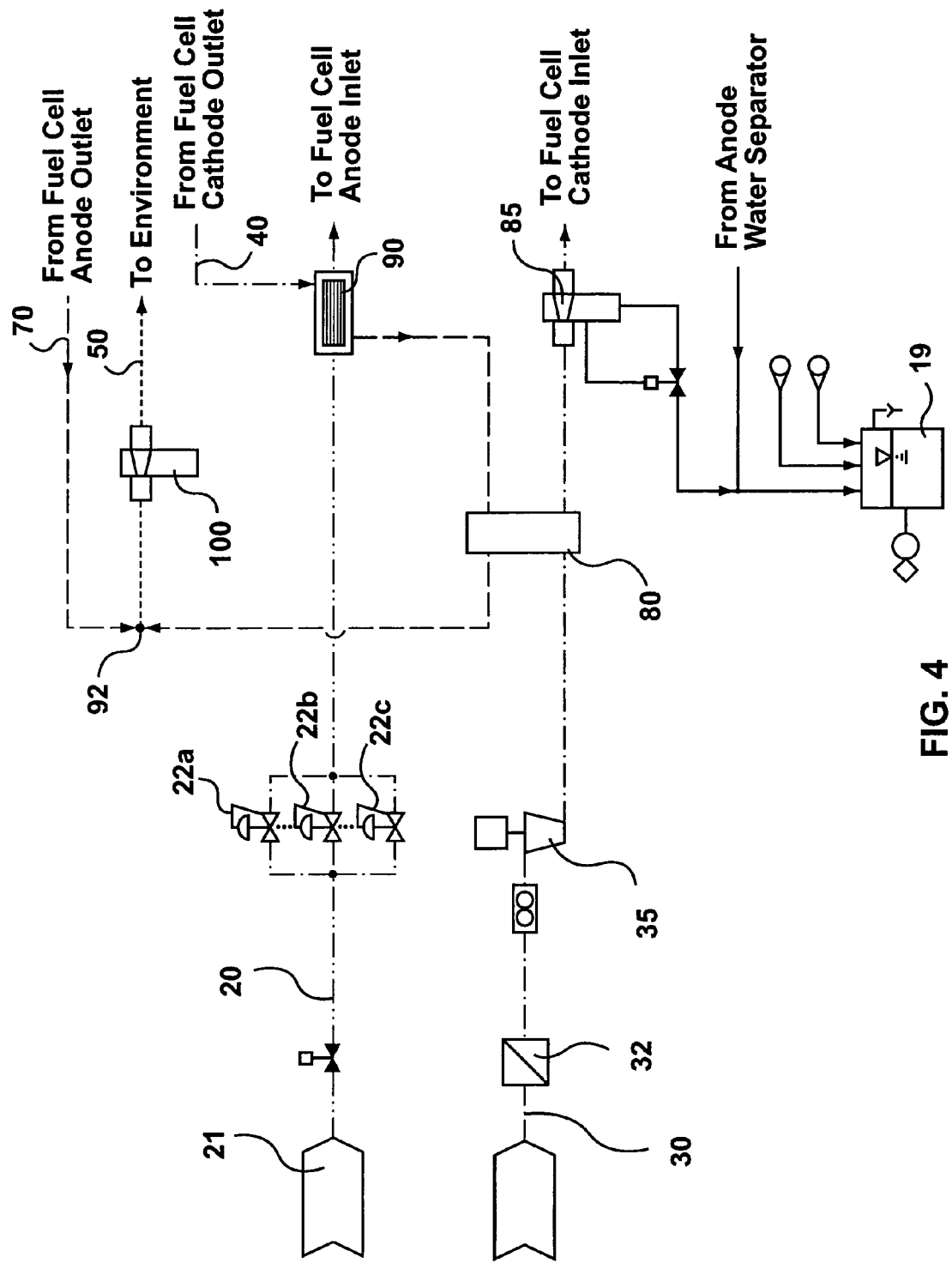
FIG. 4, in a partial schematic flow diagram, illustrates a fourth embodiment of a fuel cell gas and water management system to which aspects of the present invention may be applied.

Preferably, a flow regulating device 22 is disposed in the fuel supply line 20 upstream from the hydrogen humidifier 90. The flow regulating device or valve 22 permits the flow of hydrogen from the hydrogen source 21 to the fuel cell 12 in response to the pressure drop in the fuel supply line 20. The flow regulating device 22 may be a forward pressure regulator having a set point that permits hydrogen to be supplied to the fuel cell 12 when the pressure in the fuel supply line 20 is below the set point due to the hydrogen consumption in the fuel cell 12. This forward pressure regulator avoids the need for an expensive mass flow controller and provides more rapid response and accurate flow control. Referring to FIG. 4, to provide more control flexibility, the flow regulating means 22 may comprise a plurality of pre-set forward pressure regulators arranged in parallel with each forward pressure regulator having a different set point. For example, a first forward pressure regulator 22a may have a set point of 10 Psig, a second forward pressure regulator 22b may have a set point of 20 Psig, a third forward pressure regulator 22c may have a set point of 30 Psig, and so on. This makes it possible to operate the fuel cell 12 with fuel supplied at different pressures and different rates at each pressure, without the need of interrupting the operation and changing the set point of the forward pressure regulator. The pressure regulators 22a, 22b and 22c are integrated internal shutoff valves, such that when one pressure regulator is open, the other pressure regulators are closed. For example, when the pressure regulator 22a is opened to provide downstream pressure of 10 Psig, the pressure regulators 22b and 22c will be closed.

Figure 5A:
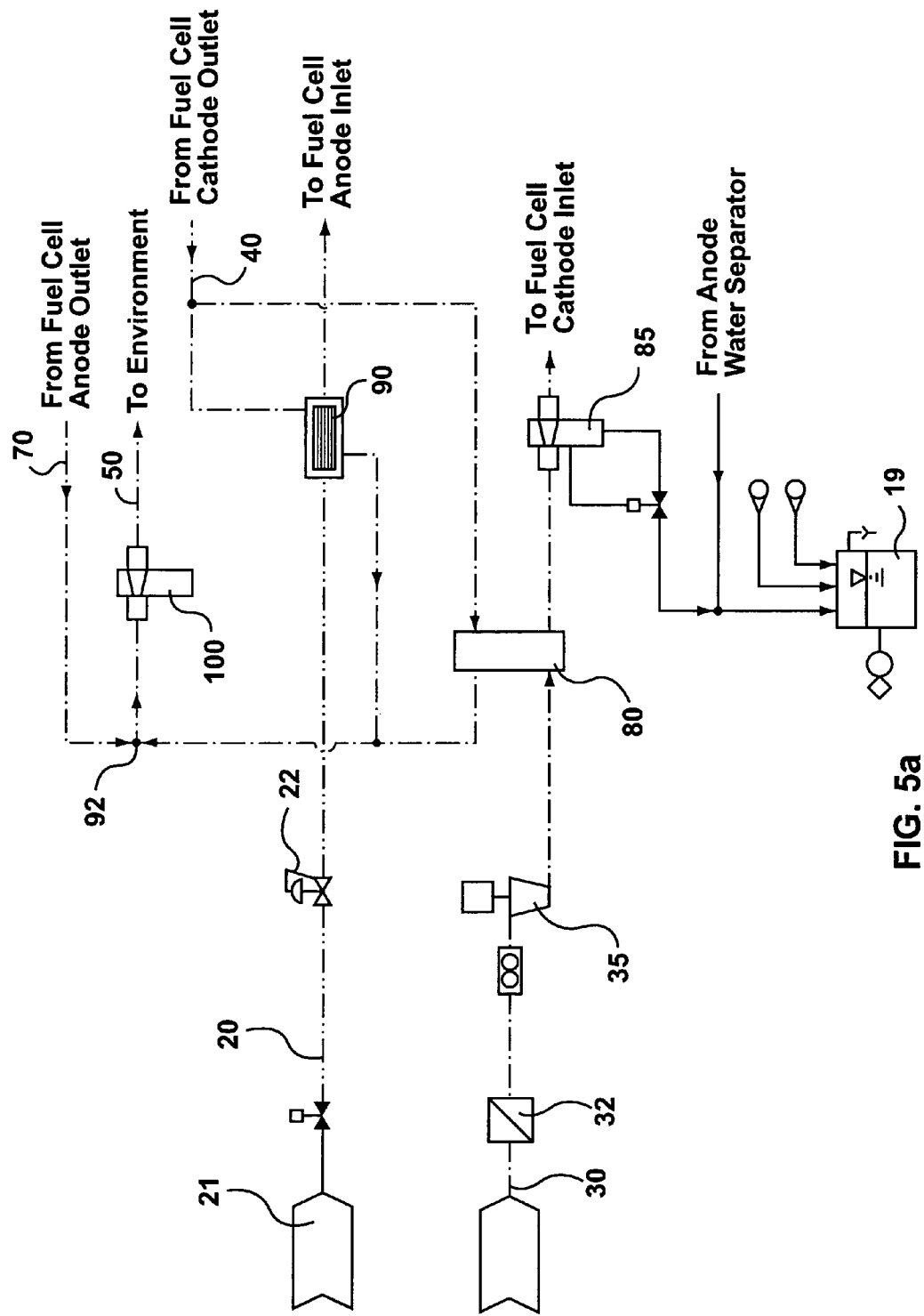
FIGS. 5a and 5b, in partial schematic flow diagrams, illustrate the connection of two regenerative dryer devices of a fuel cell gas and water management system to which aspects of the present invention may be applied.
Figure 5B:
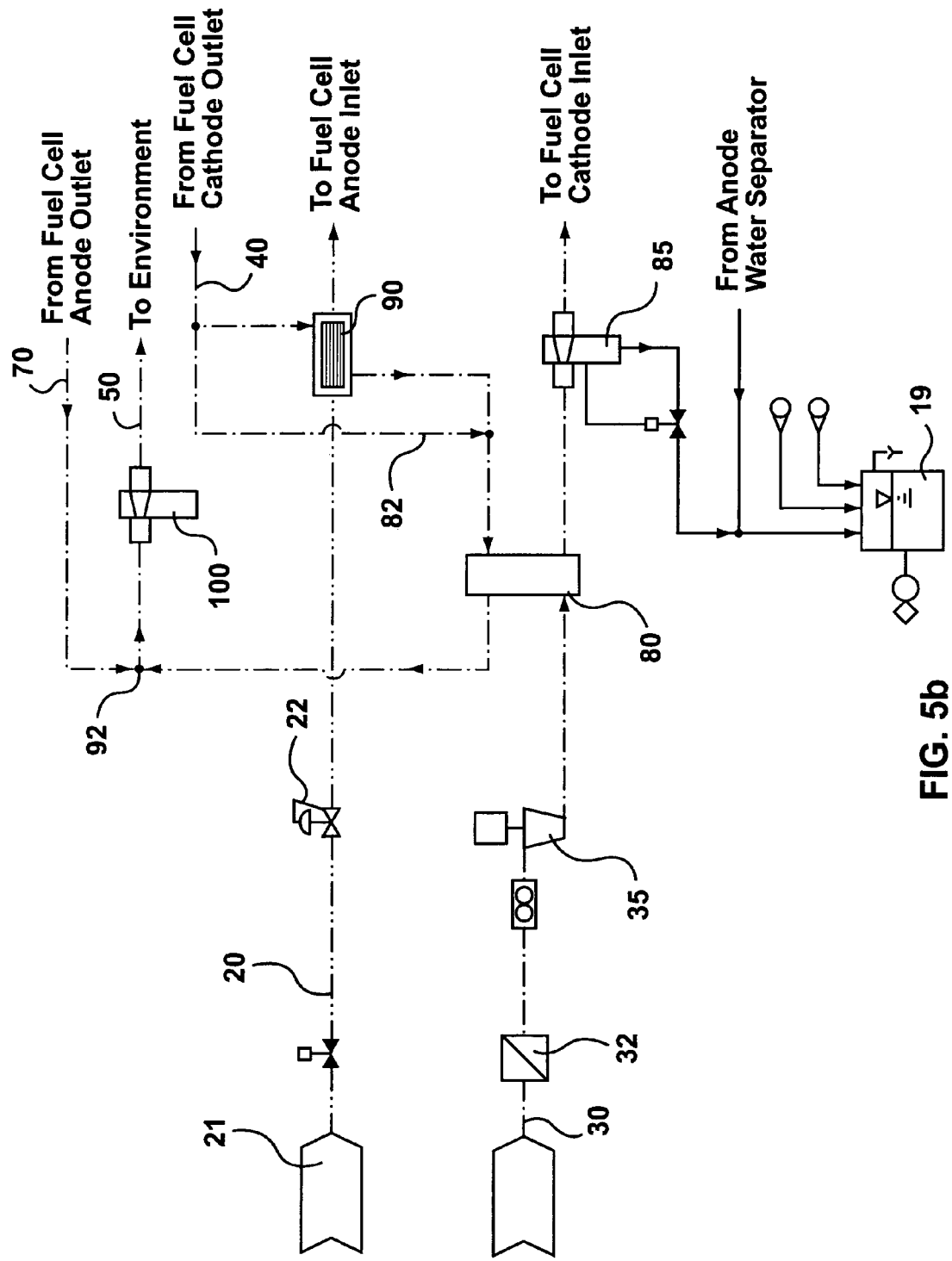

It is to be understood that although in this embodiment, the cathode exhaust is used to first humidify the incoming hydrogen and then the incoming air, this order is not essential. Instead, the cathode exhaust may be used to first humidify the incoming air and then the incoming hydrogen. Alternatively, as shown in FIG. 5a, the hydrogen humidifier 90 and the regenerative dryer 80 may be placed in parallel instead of series in the cathode exhaust recirculation line 60, so that the humidification of both hydrogen and air occurs simultaneously. Optionally, depending on the operation condition of the fuel cell 12, when the serial humidification is employed, a bypass line 82 may be further provided, as shown in FIG. 5b, to bypass the hydrogen humidifier 90 so that a portion of the cathode exhaust stream flows to the regenerative dryer 80 without passing through the hydrogen humidifier.

However, in practice it may be preferable to humidify hydrogen stream first since anode dew point temperature is desired to be higher than the cathode dew point temperature because water is naturally transferred from the anode to the cathode in the fuel cell 12. The desired relative humidity of hydrogen is also often higher than that of air in the fuel cell 12 so that the fuel cell 12 will not be flooded. Therefore, it is preferable to use the cathode exhaust stream to exchange heat and humidity with incoming hydrogen stream first.

In known manner, various sensors can be provided for measuring parameters of the stream of fuel, oxidant and coolant, supplied to the fuel cell 12. Optionally, the sensors can measure just the temperature of the reactants. The humidity would then be determined from known temperature—humidity characteristics, i.e. without directly measuring humidity.

It can be appreciated that in the present invention it is not essential to over saturate process gases, condense water out to obtain 100% relative humidity and then deliver the process gases at certain temperature to get desired relative humidity before they enter the fuel cell 12, as in the applicant's co-pending U.S. patent application Ser. No. 09/801,916. The present system is applicable to fuel cell systems where fuel and oxidant stream either have or do not have 100% relative humidity. An anode dew point heat exchanger and a cathode dew point heat exchanger may be provided to control the humidity of fuel and oxidant when the fuel cell 12 is not operable with fuel or oxidant having 100% relative humidity. However, this totally depends on the characteristic of the fuel cell 12, such as the operating condition of the proton exchange membrane.

Figure 3:
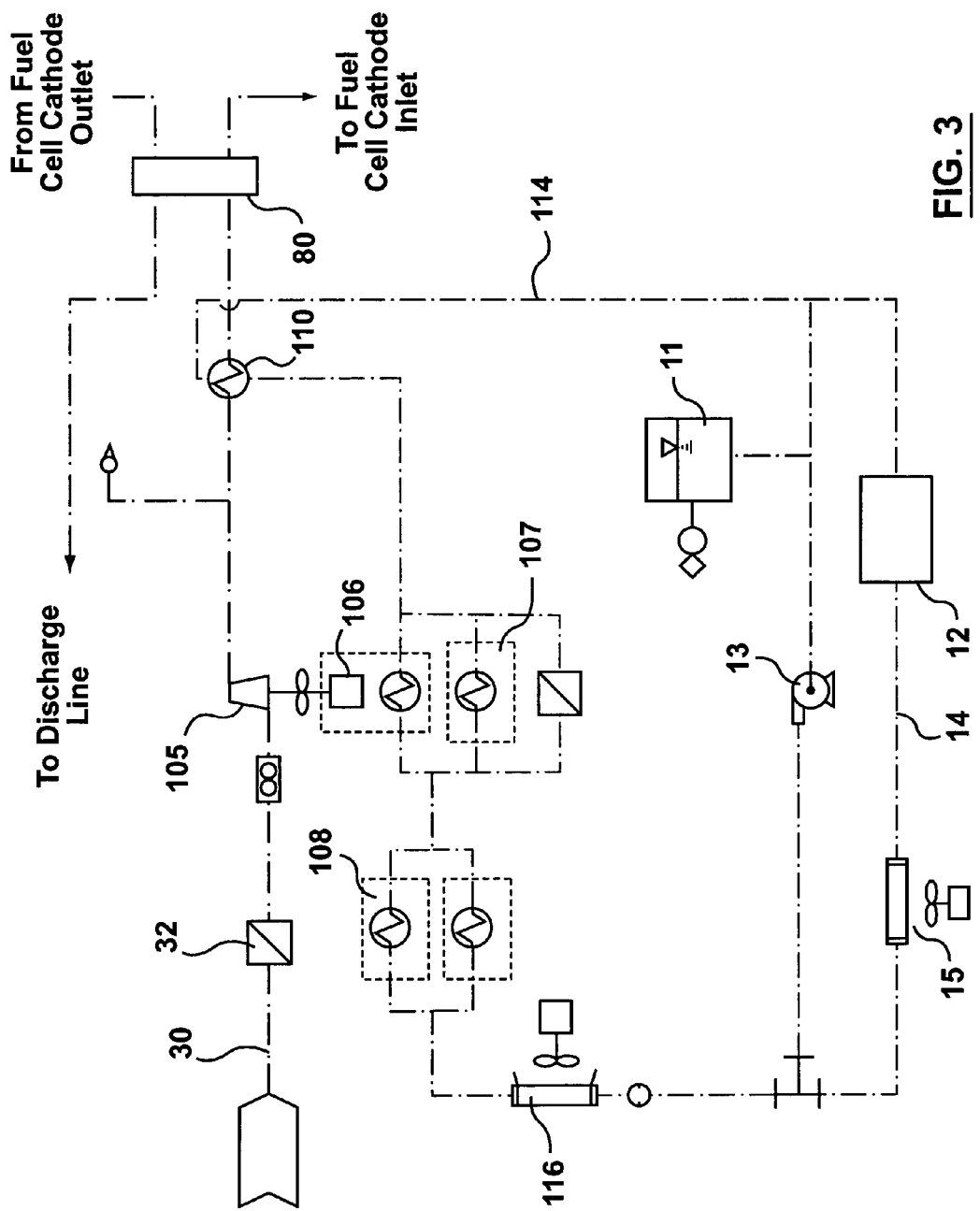
FIG. 3, in a partial schematic flow diagram, illustrates a third embodiment of a fuel cell gas and water management system, which operates under high pressure, to which aspects of the present invention may be applied.

It is also to be understood that this first embodiment of the fuel cell system to which the present invention can be applied operates under ambient pressure or near ambient pressure. Referring to FIG. 3, there are illustrated cooling loops for use in a third fuel cell system to which the present invention can be applied that operates under high pressure, i.e. greater than atmospheric pressure.

In the third fuel cell system, similar components are indicated with same reference numbers, and for simplicity and brevity, the description of those components is not repeated.

In this third fuel cell system, a high pressure compressor 105 is provided in the oxidant supply line 30 upstream from the regenerative dryer 80 to pressurize the incoming air from the air filter 32. An after cooler heat exchanger 110 is provided between the compressor 105 and the regenerative dryer 80 to cool the compressed air having an elevated temperature. Hence, in addition to the first cooling loop 14 for the fuel cell 12, a third cooling loop 114 is provided including the after cooler heat exchanger 110 in the form of a water-water heat exchanger. The third cooling loop 114 may also run through a compressor motor 106, a compressor motor controller 107 and a power switching board 108 for the compressor 105, for cooling these components. The coolant in both first and third cooling loops 14 and 114 is driven by the first coolant pump 13. Similar to the radiator 18 in a second cooling loop, a radiator 116 with a powered fan is provided in the third cooling loop 114. This radiator 116 could optionally be replaced by a different heat exchange mechanism.

Regardless of the pressure under which the fuel cell system is operating, it is often preferably to balance the pressure of both fuel stream and oxidant stream supplied to the fuel cell 12. This ensures no significant pressure gradient exists within the fuel cell 12 and hence prevents damage of the fuel cell and prevents flow of reactants and coolants in undesired directions caused by pressure gradient. In addition, this also ensures proper stoichiometry of fuel and oxidant is supplied to the fuel cell 12 for reaction.

Figure 6:
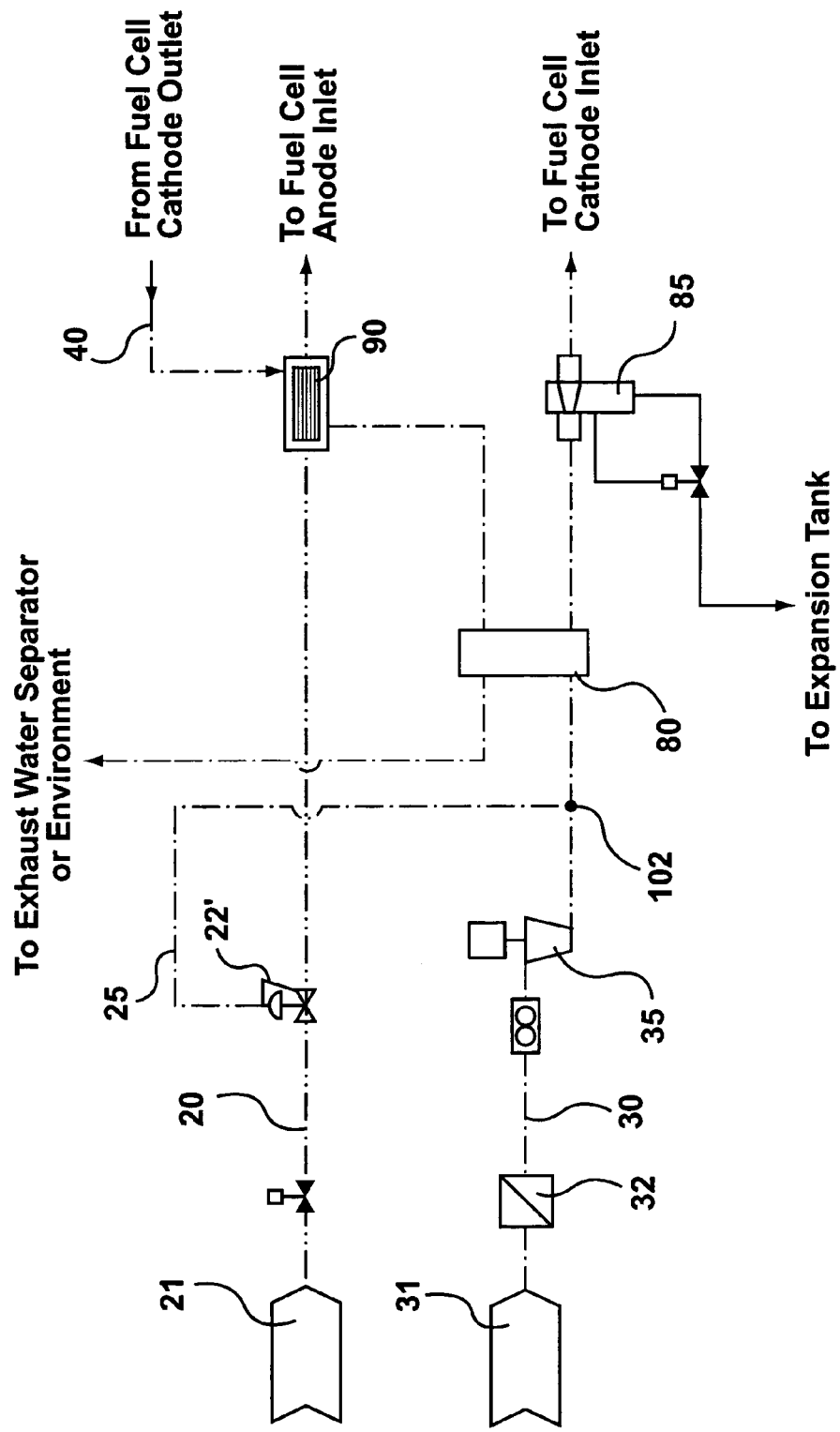
FIG. 6, in a partial schematic flow diagram, illustrates a pressure balancing mechanism of a fuel cell gas and water management system to which aspects of the present invention may be applied; and, FIG. 7, in a block diagram, illustrates a controller of the fuel cell gas and water management system of FIG. 1.

In the fuel cell systems illustrated, this is done by providing a balance pressure regulator 22' and a pressure balancing line 25 between the fuel supply line 20 and the oxidant supply line 30, as shown in FIG. 6. The pressure balancing line 25 fluidly connects the balance pressure regulator 22' disposed in the fuel supply line 20 upstream of the hydrogen humidifier 90, and a third joint 102 in the oxidant supply line 30 upstream of the regenerative dryer 80. The balance pressure regulator 22' can still be a forward pressure regulator. However, it has to be adapted to work with two fluid streams and serves to balance the pressure between the two fluid streams. An example of this balance pressure regulator 22' is disclosed in the applicant's copending U.S. patent application Ser. No. 09/961,092, incorporated herein by reference. Generally, such balance pressure regulator 22' regulates the hydrogen flow in response to the pressure of air stream introduced by the pressure balancing line 25, and achieves mechanical balance until the pressure of hydrogen flow is regulated to be equal to that of the air flow.

It can be appreciated that the pressure balancer can be disposed in oxidant supply line 30 so that the pressure of the air stream can be regulated in response to that of the hydrogen stream. However, in practice it is convenient to set the pressure of the air stream by a choosing suitable speed or capacity of blower or compressor and to change the pressure of the hydrogen stream accordingly. Hence, it is preferred to make the pressure of the hydrogen stream track that of the air stream. In some systems, the pressure balance between two reactant incoming streams are set manually or by a controller. However, the present configuration automatically ensures the pressure balance.

As mentioned above, humidification of reactant streams is a major concern of fuel cell system designers. On the other hand, flooding is also a problem that frequently occurs in fuel cells since reactant streams are usually humidified and water is a product of fuel cell reaction. When one or more cells is flooded in a fuel cell stack, cell voltage of the flooded cell drops and hence the power output of the fuel cell stack decreases. Flooding significantly affects the performance of a fuel cell power system and may lead to permanent damage to the fuel cell stack.

In the present invention, the flooded cells are recovered almost instantaneously by supplying increased amount of reactants to the fuel cell 12 for a short period of time thereby pushing contaminants and water out of the flooded cells. To this end, as shown in FIG. 1, a cell voltage monitoring device 200 is provided to monitor a plurality of cells within the fuel cell 12. A controller 300 is provided to receive at least the monitored cell voltage from the cell voltage monitoring device 200. The monitored cell voltage is supplied to the controller 300 via signal line 220 in the form of either analog or digital electronic signals representing the measured cell voltages. It can be understood that the controller 300 may also receive signals from other components in the fuel cell system 10 and control various devices accordingly.

In the present invention, the controller 300 controls the operation of at least the hydrogen purge device 72 via control line 230 and the blower 35 via control line 240. In stable operation, the controller 300 controls the blower 35 to operate at a certain speed and controls the hydrogen purge device 72 to open and purge anode exhaust from the fuel cell 12 for a certain period of time and at certain intervals. Cell voltages are continuously monitored and supplied to the controller 300. In case the measured cell voltage for at least one cell drops beyond a first value, which in most cases, means the cell is flooded, the controller 300 controls the hydrogen purge device 72 to purge anode exhaust through the hydrogen purge line 70. Meanwhile, the controller 300 also controls the air blower 35 to increase its speed and hence supply increased amount of oxidant to the fuel cell 12. Preferably, the controller 300 controls the blower 35 to operate at its maximum speed. The hydrogen purge operation allows "fresh" hydrogen to be introduced into fuel cell 12 and since more oxidant is also introduced by increasing the blower speed, water generated within and flooding the fuel cell 12 is pushed out of the fuel cell 12. This recovers the flooded cell and cell voltage will then increase. When all the cell voltages increase beyond a second value, the controller 300 controls the hydrogen purge device 72 to close and controls the blower 35 to return to its previous speed during stable operation. This second value may not necessarily be the same as the first value. The first and second values are predetermined and stored in the controller 300. It can be understood that the voltage monitoring device 200 can be an integral part of the controller 300.

In practice, this operation is usually held for several seconds, e.g. 5 seconds. This is found to be sufficient to recover flooded cells. This method ensures that the fuel cell 12 operates at its optimum condition most of the time, extends lifespan of the fuel cell and enables the fuel cell power system 10 to deliver relatively constant power.

Figure 7:
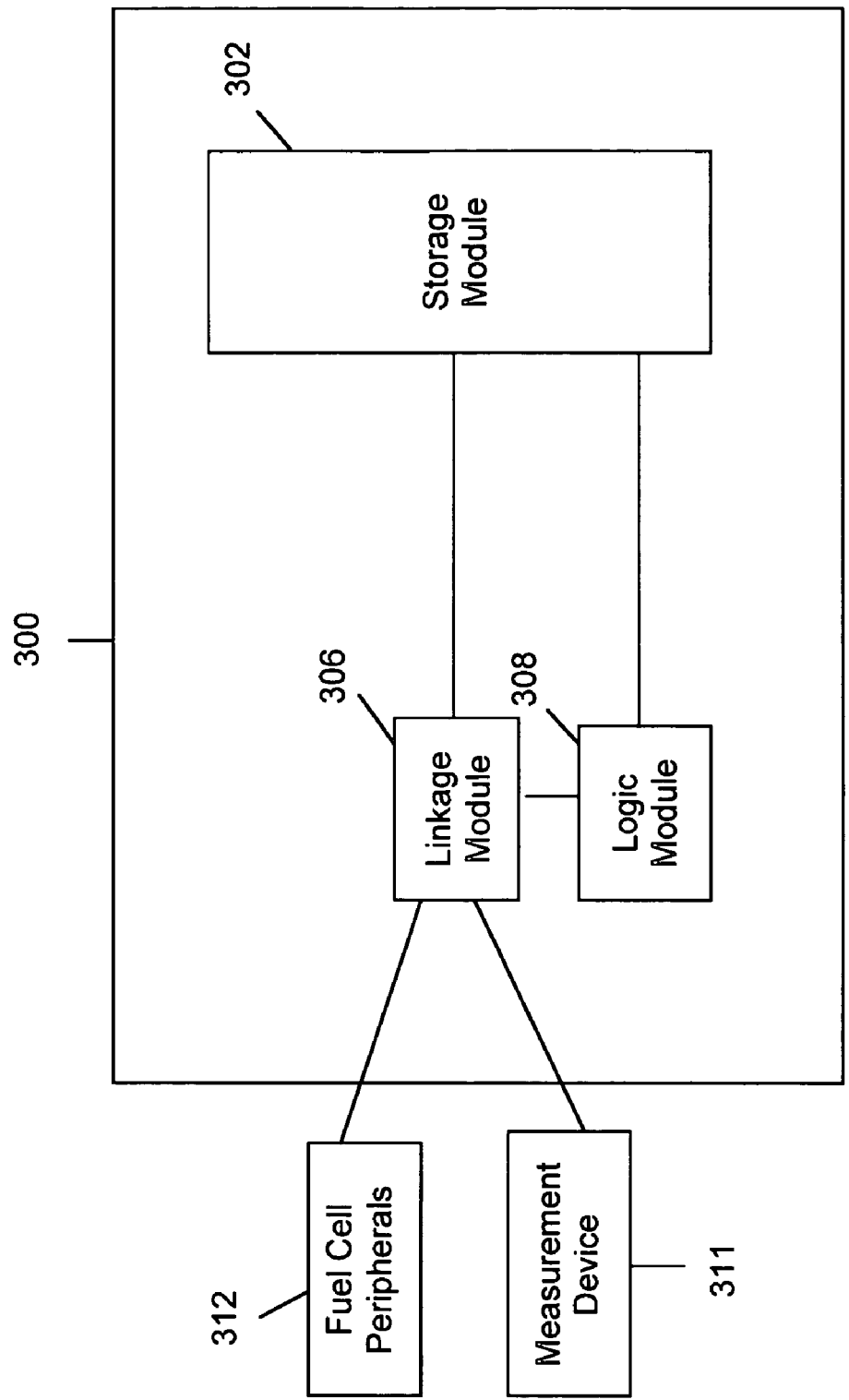

Referring to FIG. 7, there is illustrated in a block diagram the controller 300 of FIG. 1. As shown, the controller 300 includes a linkage module 306 for linking the controller 300 to a plurality of fuel cell peripherals 312. The plurality of fuel cell peripherals 312 may include, for example, the blower 35 for increasing the incoming reactant flow rates, or the purge valve 72 for purging anode exhaust.

Controller 300 is also linked by the linkage module 306 to measurement device 311. Typically, as described above, the measurement device 311 would be the cell voltage monitoring device 200. Alternatively, however, other measuring devices for measuring the AC impedance or high frequency resistance of the fuel cell could be used to monitor whether or not the fuel cell is flooded.

Fuel cell operation information is stored in the storage module 302. The fuel cell operation information includes a normal operation range, and the first value that is outside this normal operation range. When the fuel cell voltage is monitored, this first value is a minimum voltage. If the fuel cell voltage falls below this minimum voltage, then a logic module 308 linked to the storage module 302 determines that the fuel cell is flooded, and via the linkage module 306, instructs fuel cell peripherals 312 to increase the reactant inflows. For example, an operating level of the blower 35 can be increased to increase the incoming reactant flow, or the purge valve 72 can be opened, at last partially, to reduce the back pressure of the anode exhaust, thereby increasing hydrogen inflow.

During the period in which the reactant inflows have been increased to address flooding, the controller 300 continues to monitor the fuel cell voltage. When this fuel cell voltage rises above the second value, then the logic module 308 determines that the fuel cell is no longer flooded, and via the linkage module 306, instructs fuel cell peripherals to return to normal operating levels, such that additional amounts of reactant inflows are no longer supplied to the fuel cell to deal with the flooding.

While the above description constitutes the preferred embodiments, it will be appreciated that the present invention is susceptible to modification and change. For example, the present invention might have applicability in various types of fuel cells, which include but are not limited to, solid oxide, alkaline, molton-carbonate, and phosphoric acid. In particular, the present invention may be applied to fuel cells which operate at much higher temperatures. As will be appreciated by those skilled in the art, the requirement for humidification is very dependent on the electrolyte used and also the temperature and pressure of operation of the fuel cell. Accordingly, it will be understood that the present invention may not be applicable to many types of fuel cells. Further, cell health can be monitored in a number of different ways in addition to monitoring overall stack voltage. That is, the voltage of individual cells or groups of cells can be monitored. Alternatively, the AC impedance or High Frequency Resistance (HFR) of the fuel cell can be used to monitor cell health. All such variations and modifications are believed to be within the sphere and scope of the invention as defined by the claims appended hereto.

The invention claimed is:

1. A fuel cell system, comprising:
   (a) a fuel cell having a cathode, a first reactant inlet and a first reactant outlet both connected to the cathode, and an anode, a second reactant inlet and a second reactant outlet both connected to the anode;
   (b) a first reactant supply subsystem including a first reactant supply means for supplying a first reactant incoming stream to the first reactant inlet of the fuel cell;
   (c) a second reactant supply subsystem for supplying a second reactant incoming stream to the second reactant inlet of the fuel cell;
   (d) a monitoring device for monitoring a fuel cell state variable indicative of flooding of the fuel cell;
   (e) a controller for controlling the first reactant supply means to provide an additional amount of the first reactant to the fuel cell cathode based on the fuel cell state variable, and for controlling the second reactant supply means to provide an additional amount of the second reactant to the fuel cell anode based on the fuel cell state variable, whereby flooding occurring in either one of the anode and cathode is displaced by the additional amounts of the first and second reactants; and
   (f) a second reactant recirculation line connected between the second reactant outlet and the second reactant inlet, and a second reactant purge means connected to the second reactant outlet, wherein the controller is operable to control the second reactant purge means to purge at least a portion of the second reactant exhaust stream from the second reactant outlet when the fuel cell state variable indicates the fuel cell is flooded.

2. A fuel cell system as claimed in claim 1, wherein the controller controls the first reactant supply means to operate at maximum capacity when the fuel cell state variable indicates the fuel cell is flooded.

3. A fuel cell system as claimed in claim 2, wherein the controller is operable to control the first reactant supply means to stop supplying the additional amount of the first reactant and to control the second reactant purge means to stop purging when the fuel cell state variable indicates the fuel cell is no longer flooded.

4. A fuel cell system as defined in claim 3 wherein the fuel cell state variable is a cell voltage and the monitoring device comprises a voltage monitor for monitoring the cell voltage.

5. A fuel cell system as defined in claim 4 wherein the controller is operable to determine that the fuel cell is flooded when the cell voltage is less than a first value.

6. A fuel cell system as defined in claim 5 wherein the controller is operable to determine the fuel cell is no longer flooded when the cell voltage is more than a second value.

7. A fuel cell system as defined in claim 6, wherein the first value is same as the second value.

8. A method of operating a fuel cell system, the fuel cell having a cathode, a first reactant inlet and a first reactant outlet both connected to the cathode, and an anode, a second reactant inlet and a second reactant outlet both connected to the anode, said method comprising:
   (a) providing a first reactant incoming stream to the first reactant inlet for supply to the cathode;
   (b) providing a second reactant incoming stream to the second reactant inlet for supply to the anode;
   (c) monitoring a fuel cell state variable indicative of flooding;
   (d) based on the fuel cell state variable, determining whether the fuel cell is flooded;
   (e) providing for recirculation of at least part of the second reactant from the second reactant outlet to the second reactant inlet;
   (f) providing an additional amount of both of the first and second reactants to the fuel cell when the fuel cell is flooded, and for the second reactant, purging at least part of the second reactant from the second reactant outlet.

9. A method of operating a fuel cell system as claimed in claim 8, wherein step (e) further comprises increasing the rate at which the first reactant supplied to the fuel cell to the maximum capacity of the fuel cell system when the fuel cell state variable indicates the fuel cell is flooded.

10. A method of operating a fuel cell system as claimed in claim 9, further comprising stopping the additional amount of the first reactant being supplied to the fuel cell and the purging of the second reactant from the second reactant outlet, when the fuel cell state variable indicates the fuel cell is no longer flooded.

11. A method of operating a fuel cell as claimed in claim 9 wherein the fuel cell state variable is a cell voltage, and step (c) comprises measuring the cell voltage.

12. A method of operating a fuel cell system as claimed in claim 11 wherein step (d) comprises determining the fuel cell is flooded when the cell voltage is less than a first value.

13. A method as defined in claim 12 wherein step (d) comprises determining the fuel cell is no longer flooded when the cell voltage is more than a second value.

14. A method of operating a fuel cell system as claimed in claim 12, wherein the first value is same as the second value.

15. A fuel system as claimed in claim 4, wherein the fuel cell comprises a plurality of fuel cells and wherein the fuel cell state variable comprises the voltages, the individual fuel cells and the monitor monitors the individual fuel cell voltages.

16. A fuel cell system as claimed in claim 3, wherein the first reactant comprises an oxidant and the second reactant comprises a fuel, and wherein a first reactant recirculation line connects the first reactant outlet to the first reactant inlet, for recirculation of the first reactant, and wherein the first reactant recirculation line passes through a humidifier, for humidifying one of the first and second reactants.

17. A fuel cell system as claimed in claim 16, wherein the humidifier is incorporated in the second reactant supply subsystem for humidifying the second reactant, and wherein a regenerative dryer is provided for humidifying the first reactant, with the first reactant recirculation line passing through the regenerative dryer and with the regenerative dryer being located in the first reactant supply subsystem.

18. A fuel cell system as claimed in claim 17, wherein the first reactant recirculation line passes through the humidifier and then through the regenerative dryer.

19. A fuel cell system as claimed in claim 17, wherein the humidifier and the regenerative dryer are configured in the recirculation line in one of:

(a) the humidification and the regenerative dryer being arranged in parallel; and (b) the humidifier and the regenerative dryer being located sequentially in the first reactant recirculation line, with a bypass line being provided around the upstream one of the humidifier and the regenerative dryer.

20. A fuel cell system as claimed in claim 16, wherein the first and second reactant outlets are connected to a common reactant discharge line.

21. A method of operating a fuel cell system as claimed in claim 11, the method being applied to a fuel cell having a plurality of individual fuel cells, and wherein step (c) comprises measuring the voltage of each individual fuel cell.

22. A method of operating a fuel cell system as claimed in claim 8, including providing the first reactant as an oxidant and the second reactant as a fuel, and recirculating the first reactant through a humidifier for humidifying at least one of the first and second reactants.

23. A method of operating a fuel cell system as claimed in claim 22, including recirculating the first reactant through a humidifier for humidifying the second reactant and through a regenerative dryer for humidifying the first reactant.

24. A method of operating a fuel cell system as claimed in claim 23, wherein the recirculated second reactant first passes through the humidifier for the second reactant and then through the regenerative dryer for humidifying the first reactant.

25. A method of operating a fuel cell system as claimed in claim 23, including passing one portion of the recirculated first reactant through the humidifier and another portion through the regerative dryer, for parallel humidification of the first and second reactants.

26. A method of operating a fuel cell system as claimed in claim 24, including providing a bypass line around the one of the humidifier and the regenerative dryer that is upstream, for optionally bypassing part of the recirculated first reactant.

27. A method of operating a fuel cell system as claimed in claim 22, including combining exhausted first and second reactants from the first and second reactant outlets and supplying the combined exhausted first and second reactants to a common discharge line.

* * * * *